US006253135B1

(12) United States Patent
Hubacher

(10) Patent No.: US 6,253,135 B1
(45) Date of Patent: Jun. 26, 2001

(54) POWER WINDOW REGULATOR FOR AUTOMOBILES

(75) Inventor: Kenneth Hubacher, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/501,952

(22) Filed: Feb. 10, 2000

(51) Int. Cl.[7] .................................. H02P 1/18; B60L 1/00

(52) U.S. Cl. ........................... 701/49; 318/10.1; 318/293; 318/280; 318/466; 318/469; 340/825.34; 340/426; 307/10.5; 307/10.1

(58) Field of Search .............................. 701/49; 318/286, 318/266, 283, 469, 466; 340/825.34; 364/424

(56) References Cited

U.S. PATENT DOCUMENTS

| | | | | |
|---|---|---|---|---|
| 4,363,011 | | 12/1982 | Bloomfield | 324/174 |
| 4,463,426 | | 7/1984 | Caddick et al. | 364/424 |
| 4,608,637 | * | 8/1986 | Okuyama et al. | 364/424 |
| 4,801,812 | * | 1/1989 | Brusasco | 307/10 R |
| 4,870,333 | * | 9/1989 | Itoh et al. | 318/286 |
| 4,899,063 | | 2/1990 | Suck | 307/9.1 |
| 5,003,836 | | 4/1991 | Mitsugu et al. | 74/425 |
| 5,081,586 | | 1/1992 | Barthel et al. | 364/424.05 |
| 5,406,270 | * | 4/1995 | Van Lente | 340/825.34 |
| 5,410,226 | * | 4/1995 | Sekiguchi et al. | 318/266 |
| 5,559,375 | * | 9/1996 | Jo et al. | 307/10.1 |
| 5,650,698 | * | 7/1997 | Ito et al. | 318/282 |
| 5,701,063 | * | 12/1997 | Cook et al. | 318/469 |
| 5,801,501 | * | 9/1998 | Redelberger | 318/283 |
| 5,872,436 | | 2/1999 | Bergman | 318/286 |
| 5,952,801 | * | 9/1999 | Boisvert et al. | 318/468 |
| 5,982,124 | * | 11/1999 | Wang | 318/466 |
| 5,983,567 | * | 11/1999 | Mitsuda | 49/26 |
| 6,031,348 | * | 2/2000 | Fehr et al. | 318/283 |

* cited by examiner

*Primary Examiner*—William A. Cuchlinski, Jr.
*Assistant Examiner*—Tuan C To
(74) *Attorney, Agent, or Firm*—David A. Mims, Jr.; Rudolf O. Siegesmund

(57) ABSTRACT

A power window regulator is disclosed comprising a regulator computer having a processor and a memory connected to a switch and/or main automotive computer and to a plurality of window processors connected to a window sensor and a window drive unit.

19 Claims, 5 Drawing Sheets

POWER WINDOW REGULATOR FOR AUTOMOBILES

FIELD OF THE INVENTION

The present invention relates to an apparatus and method for controlling the movement of power windows in an automotive vehicle by allowing an operator to move the windows to predetermined positions either by operator movement of a designated switch or in response to a variety of sensors in the automotive vehicle.

BACKGROUND OF THE INVENTION

Power windows are standard features on most automobiles and are controlled from an array of switches located on a console either on the driver side door or a console between the front driver and passenger seat. Even with climate control, there are instances where it is desirable to open, close or move one or more of the windows in the automobile to an intermediate position. The driver must visually monitor the roll up or roll down motion of the glass pane and stop its motion in the desired position by manipulating a drive switch. Performing such an operation during the operation of the motor vehicle can distract the driver from the roadway and become a safety hazard. Other instances exist where it is desirable for the power windows to open or close automatically. For example, if the driver has left the windows open and rain begins to fall, it would be desirable for the windows to close in response to a rain sensor. Likewise, if the car alarm sounds in response to detection of movement around the automobile, it would be desirable for any open windows to be closed. Additionally, operators sometimes leave children or pets unattended in a closed automotive vehicle, either intentionally or by accident, with tragic consequences due to the high temperatures that be reached in a closed vehicle. Such instances could be safeguarded by a device that would cause the windows to open automatically in response to a temperature sensor and occupant sensor. For example, if a rear seat belt indicator confirmed engagement of one or more rear seat belts and a temperature sensor indicated a temperature threshold, the automatic windows would open.

The prior art discloses position sensors for powered devices such as windows and seats in automotive vehicles and methods of controlling the powered devices. U.S. Pat. No. 5,952,801 discloses a method and apparatus for de-activating a power window if an obstacle is encountered. The obstacle is detected by using a current sensor to compare window motor current against a threshold current to calculate when an obstacle has been detected. U.S. Pat. No. 5,081,586 discloses a multiplex communication system for selectively operating a variety of powered devices such as power window, power seats, power door locks, power mirrors and other accessories by means of a microcomputer. U.S. Pat. No. 5,003,836 discloses a worm gear for driving devices such as automotive power windows and power seats where the worm gear motor has a built in sensor and notched wheel attached to the output shaft. A magnet and magnetic sensor detect the passage of the notch to count the revolutions of the wheel and thereby determine a predetermined rotational position of the output shaft. U.S. Pat. No. 4,463,426 discloses a seat position control device using commercially available microprocessors and electrical components to count the pulses generated by the seat motor relative to a reference to determine the position of the seat. U.S. Pat. No. 4,364,011 discloses a means for producing an electrical signal indicative of the movement of one part of a mechanical assembly relative to another. The '011 patent further discloses a sensor monitoring motion of a toothed or molded component utilizing galvanometric means such as a Hall effect, a magnetoresistor or a Wiegand effect device.

What is needed beyond the prior art is an apparatus and method for moving the power windows of an automobile to predetermined positions in response to an operator switch or in response to sensors located on or in the automotive vehicle.

SUMMARY OF THE INVENTION

The invention meeting the needs identified above is a power window regulator comprising a regulator computer having a processor and a memory connected to a switch or to a switch and a main automotive computer and to a plurality of window processors connected to a window sensor and a window drive unit.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
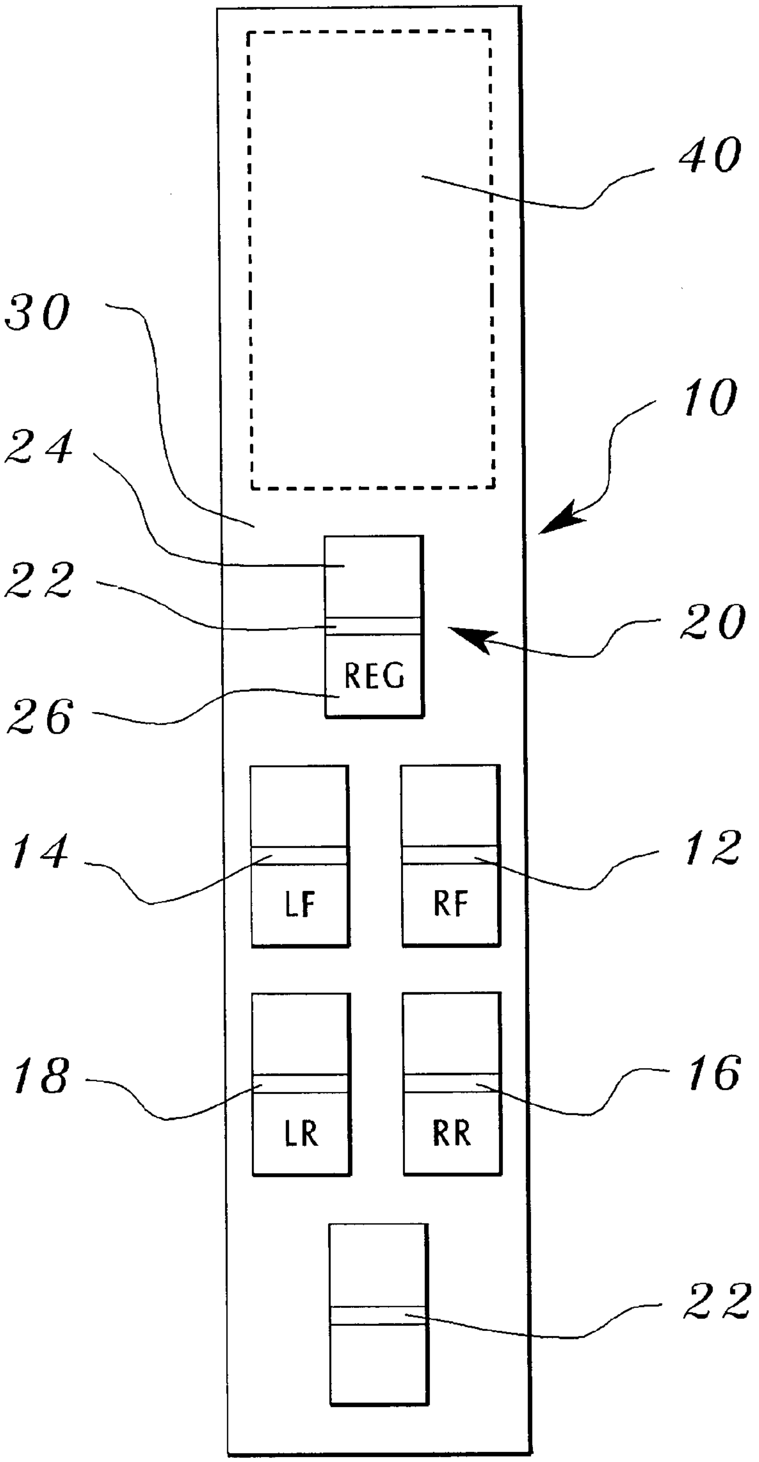
FIG. 1 depicts a generic door console.

FIG. 1 depicts console 10 for controlling power windows of an automotive vehicle. Console 10 has face 30 and option area 40 may contain additional control devices. For reference purposes herein, console 10 is oriented so that face 30 is generally parallel to the door of the automotive vehicle (not shown) and option area 40 is located at the end of face 30 that is toward the front of the automotive vehicle. For purposes of the invention disclosed herein, console 10 may be located in any convenient area of the automotive vehicle and components positioned in console 10 described herein may be positioned within console 10 in any convenient configuration. Normally, there are four powered windows in an automotive vehicle. Left front switch 14 controls the left front window. Right front switch 12 controls the right front window. Left rear switch 18 controls the left rear window. Right rear switch 16 controls the right rear window. One or more optional powered windows may be provided. One option switch 22 is shown. However, additional switches may be provided for additional options. Regulator switch 20 may be moved forward or backward and controls all of the windows simultaneously. In other words, when moved from a first position to a second position, regulator switch 20 will cause the left front, right front, left rear, right rear and any optional windows to move to predetermined positions in response to instructions caused to be issued by the movement of regulator switch 20. Regulator switch 20 as shown has ridge 22 extending upward from base 24. Ridge 22 is generally perpendicular to base 24 and is shown at rest in a first position. Regulator switch 20 can be moved forward toward front section 24 to a second position or backward toward rear section 26 to a third position. When released, regulator switch 20 will return to the first position. However, any type of switch may be used where the switch causes movement from a first position to a second position. Alternatively, regulator switch 20 may be a type of switch that is activated by being depressed downward from a first position to a second position and that, when released, returns to the first position.

Figure 2:
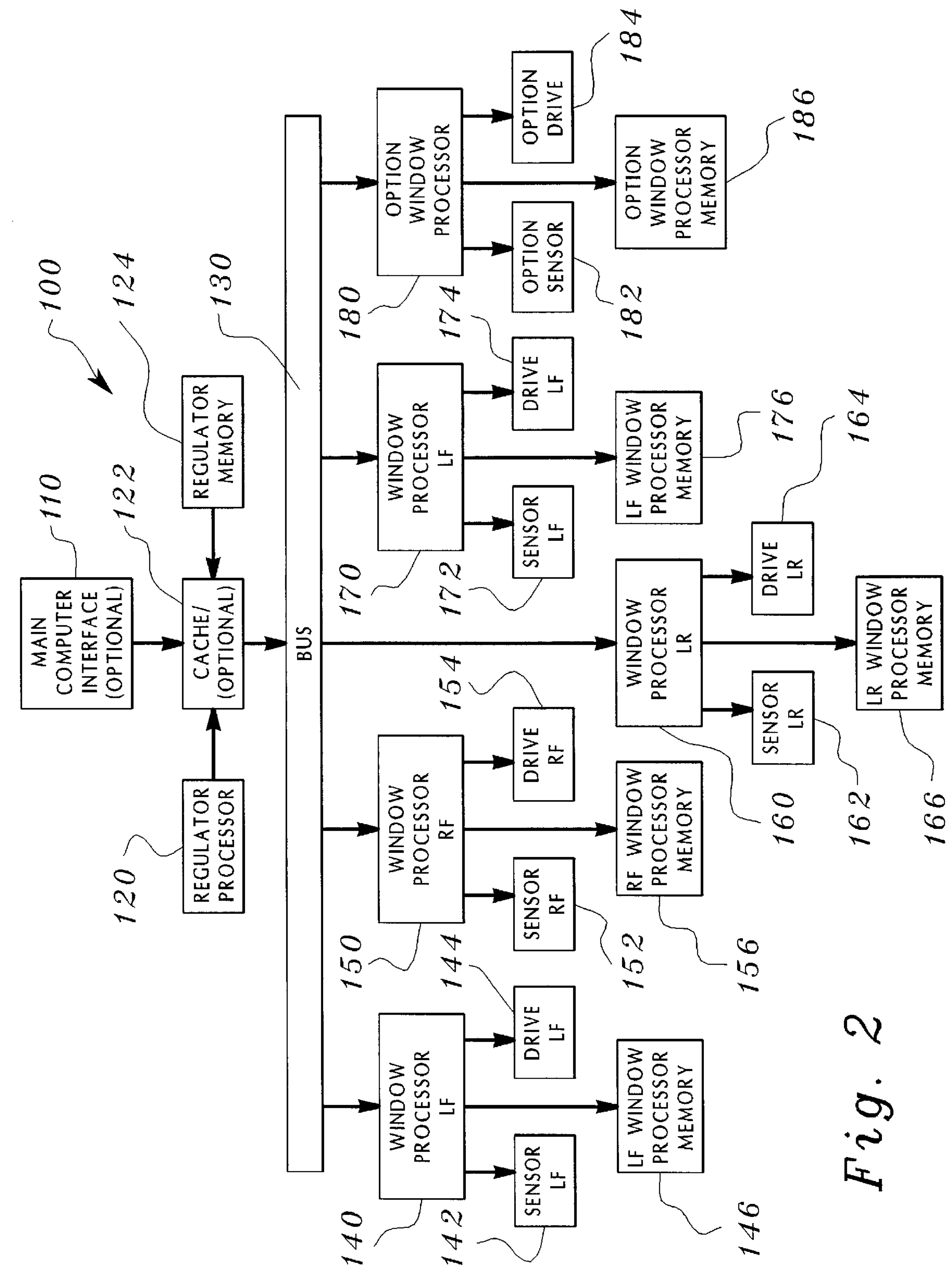
FIG. 2 depicts an overview of the regulator components.

FIG. 2 shows the components of regulator 100. Regulator 100 is activated by movement of regulator switch 20 (shown in FIG. 1). Regulator 100 may have an optional interface 110 which connects regulator 100 to a main automotive computer (not shown). As used herein, interface means hardware, software or both that links systems, programs or devices. Regulator 100 further has regulator processor 120 connected to cache 122 and regulator memory 124. Cache 122 is connected to bus 130. Cache 122 is optional and may or may not be included in Regulator 100. Regulator processor 120, regulator memory 124 and optional cache 122 may be physically separate or they may be physically combined. As used herein, cache means a special purpose buffer storage, smaller and faster than main storage, used to hold a copy of instructions and data. As used herein, bus means a facility for transferring data between several devices located between two end points, only one device being able to transmit at a given moment. As used herein, processor means one or more integrated circuits that process coded instructions and perform a task. As used herein, memory means all of the addressable storage space in a processing unit and other internal storage that is used to execute instructions. Regulator 100 also has the following components connected to bus 130: left front window processor 140 connected to left front sensor 142, left front drive 144 and left front window processor memory 146; right front window processor 150 connected to right front sensor 152, right front drive 154, and right front window processor memory 156 left rear processor connected to left rear sensor 162, left rear drive 164 and left rear processor memory; and right rear processor 170 connected to right rear sensor 172, right rear drive 174 and right rear processor memory 176. The processor, sensor and memory for each window may be physically combined in one unit or they may be in physically separate units or one may be physically separate and the others physically combined. As used herein, sensor means a device that connects measurable elements of a physical process into data meaningful to a computer or processor. One or more option processors 180 may be connected to bus 130. Option processor 180 has option sensor 182, option drive 184 and option memory 186. Left front drive 144, right front 154, left rear drive 164 and right rear drive 174 will vary from one make of automotive vehicle to another. However, automotive power window drives are electrically powered and either generate a signal that can be monitored or turn a drive shaft that can be configured to monitor the revolutions of the drive shaft. Left front sensor 142, right front sensor 152, left rear sensor 160 and right rear sensor 170 will vary from one make of automotive vehicle to another and can monitor either electrical pulses or revolutions of the motor drive shaft in order to send a signal to the window processor units. Left front window processor 140, right front window processor 150, left rear window processor 160 and right rear window processor 170 have the following functions: to receive data from the sensor, to send position addresses to the regulator processor, to receive position addresses from the regulator processor, to cause the drive to move the window a distance corresponding to a pre-determined position and to stop at that pre-determined position when the sensor indicates the required distance has been traveled.

Figure 3:
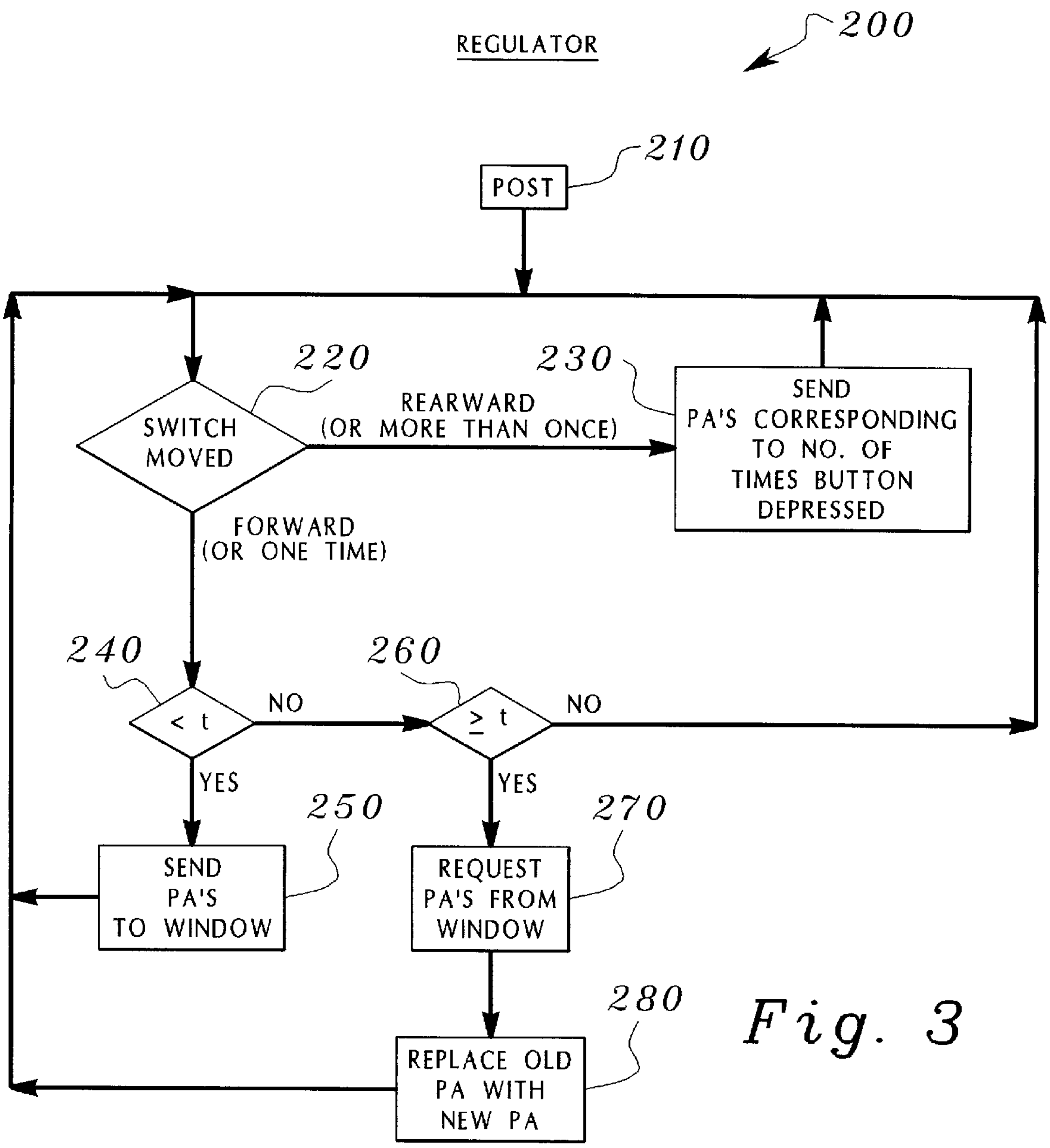
FIG. 3 depicts a flow chart of the regulator process.

FIG. 3 shows the regulator process which takes place in regulator processor 120 (FIG. 2) and regulator memory 124. When the ignition of the automotive vehicle is turned on regulator processor 120 will perform a power on self test (POST) 210. The vehicle operator has several choices in using regulator switch 20 (FIG. 1). When regulator switch 20 is moved, processor 120 15 determines whether regulator switch 20 has been moved forward to a first position or rearward to a second position. If regulator switch 20 has been moved forward from a first position to a second position, processor 120 determines whether regulator switch 20 has been held in the second position for less than a predetermined time "t". If regulator switch 20 has been held forward for less than time "t" then processor 120 sends position addresses to the client processors. The position addresses are unique numbers that can be translated by the client processors into the number of revolutions or electrical pulses that will take the automobile window to a position corresponding to the position number.

In the case of a regulator switch that is depressed downward from a first position to a second position, processor 120 determines whether regulator switch 20 has been depressed. Processor 120 then determines whether regulator switch 20 has been held in the second position for less than a predetermined time "t". If regulator switch 20 has been held in the second position for less than time "t" then processor 120 sends position addresses to the client processors.

If processor 120 determines that regulator switch 20 has been moved forward and held for a time greater than a predetermined time "t" then processor 120 will request that the window processors send position addresses for each of the windows. The position addresses received will be the unique numbers corresponding to the particular window and to the position of that particular window at the time the request was made. These numbers will then be placed in memory as the position addresses for each window. The first time, or initialization, or any time the operator desires to change the position of the driver preference position of the windows, the operator can move each window to the desired position using left front switch 14, right front switch 12, left rear switch 18 and right rear switch 16. When the operator has all windows in the position desired, the operator then moves regulator switch 20 from the first position to the second position and holds regulator switch 20 in the second position for a time greater than or equal to time "t". Responsive to regulator switch 20 being held in the second position for time greater than "t", the position addresses for the new window positions, the regulator processor will request position addresses from the window processors and upon receipt from the window processors, will replace in memory the former position addresses with the new position addresses for the operator preferences.

In the case of a regulator switch that is depressed downward from a first position to a second position, processor 120 determines whether regulator switch 20 has been depressed to the second position for a time greater than "t" and then proceeds as described above.

After activation by movement of regulator switch 20 from a first position to a second position or depression of regulator switch 20 from a first position to a second position, processor 120 then waits for a new activation by the vehicle operator through movement or depression of regulator switch 120.

The method of determining the position address for each window is as follows. Each window can be full open (FO), full closed (FC) or partially open (PO). At the FO position the window has not traveled any distance and is retracted inside the door of the automotive vehicle. The greatest distance the window can travel is from FO to FC. At FC the window has traveled to the limit it can go and has entered a recessed space in the body of the automotive vehicle above the door of the automotive vehicle. A PO position can be reached by raising the window from FC or by lowering the window from FO or by raising or lowering the window some distance from a previous PO position. When the window travels a distance between FO and FC the sensor for that window monitors the electrical pulses of the motor or records the number of gear turns of the drive and calculates the sensor address. The window travel options and sensor addresses are summarized below:

| Window Position | Distance moved | Action by sensor |
|---|---|---|
| Full Closed (FC) | x | Records number gear turns or electrical pulses equal to x |
| Full Open (FO) | 0 | Records position address 0 |
| Partially Open (from FO) | e | Records number gear turns or electrical pulses equal to distance “e” traveled. Sensor address is “e”. |
| Partially Open (from FC) | x − e = d | Initial position address is x. Records number gear turns or electrical pulses equal to distance “e” traveled. Subtracts e from x. Sensor address is “d”. |
| Partially Open (from PO) Window moves up | d + e = f | Records number gear turns or electrical pulses equal to distance “e” traveled and adds to prior position address d. Sensor address is “f”. |
| Partially Open (from PO) Window moves down | d − e = g | Records number gear turns or electrical pulses equal to distance “e” traveled and subtracts from prior position address d. Sensor address is “g”. |

In order to process the four new addresses, each window has a unique designator. For example, LF can be 1, RF can be 2, LR can be 3 and RR can be 4. Regulator processor 120 queries each of the incoming messages for the window designator and processes one message at a time starting with LF at 1, then RF at 2 and so on. Regulator processor 120 then causes the old position address for each window to be replaced by the new position address.

In an alternate embodiment the sensors can determine the position of the windows by being positioned to read a strip embedded in the window material. For example, the strip may have unique identifiers for a plurality of window positions which are capable of being read by the sensors to determine the window position. The strip may be metallic or semi-metallic. Further in the alternative, the sensors may record an increasing or decreasing signal strength from the embedded strip due to an increasing or decreasing strip density allowing identification of position based on the strip density. The employment of embedded strips in the window material can eliminate the necessity for the processors to calculate the window position.

Regulator 100 may have the option of moving the windows to set predetermined positions. If regulator switch 20 is moved rearward to a third position, processor 120 will send position addresses to the window processors and the window processors will cause the drives to move the windows to positions corresponding to the position addresses for predetermined positions. For example, if regulator switch 20 is moved rearward once, a full open position address would be sent to the client processors causing all of the windows to go to the full open position. Likewise, if regulator switch 20 was moved rearward two times, a full closed position address would be sent to the client processors causing the windows to go to the full closed position. Additionally, if regulator switch 20 was moved rearward three times, an intermediate position address would be sent to the client processors causing all of the windows to go to a half-open position. If regulator switch 20 does is a switch that is activated by depression and does not have a third position, the same functions can be achieved by depressing regulator switch 20 additional times.

| Function | Switch with Third Position | Switch with only Two Positions |
|---|---|---|
| Full Closed | Move once | Depress twice |
| Full Open | Move twice | Depress three times |
| Intermediate | Move three times | Depress four times |

Figure 4:
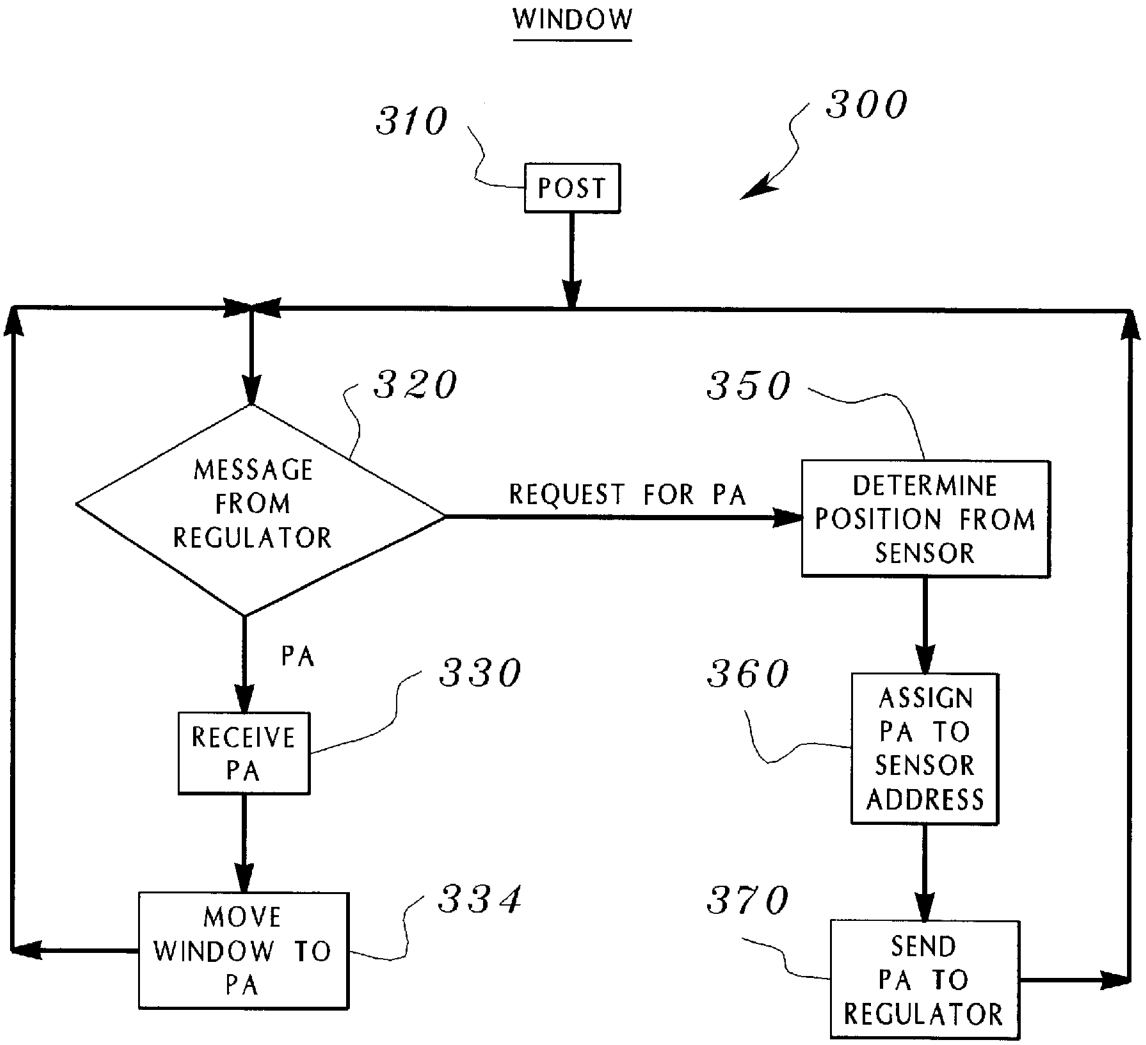
FIG. 4 depicts a flow chart of the client process.

FIG. 4 shows the process in the window processors. When the ignition is turned on, left front window processor 140, right front window processor 150, left rear window processor 160 and right rear window processor 170 perform a power on self test (310). Upon receipt of a signal from the regulator, the client processor determines whether the regulator is sending a position address or requesting a position address (320). If the regulator is sending a position address then the client processor receives the position address (330) and directs the motor to move the window until the window is positioned corresponding to the position address (340). The processor then awaits the next signal from the regulator. If the client processor determines that the regulator has requested a position address, then the client processor determines the position of the window (350). Next, the client processor assigns a position address number to the position data determined from the sensor (360). Then the window processor sends the position address to the regulator (370).

Figure 5:
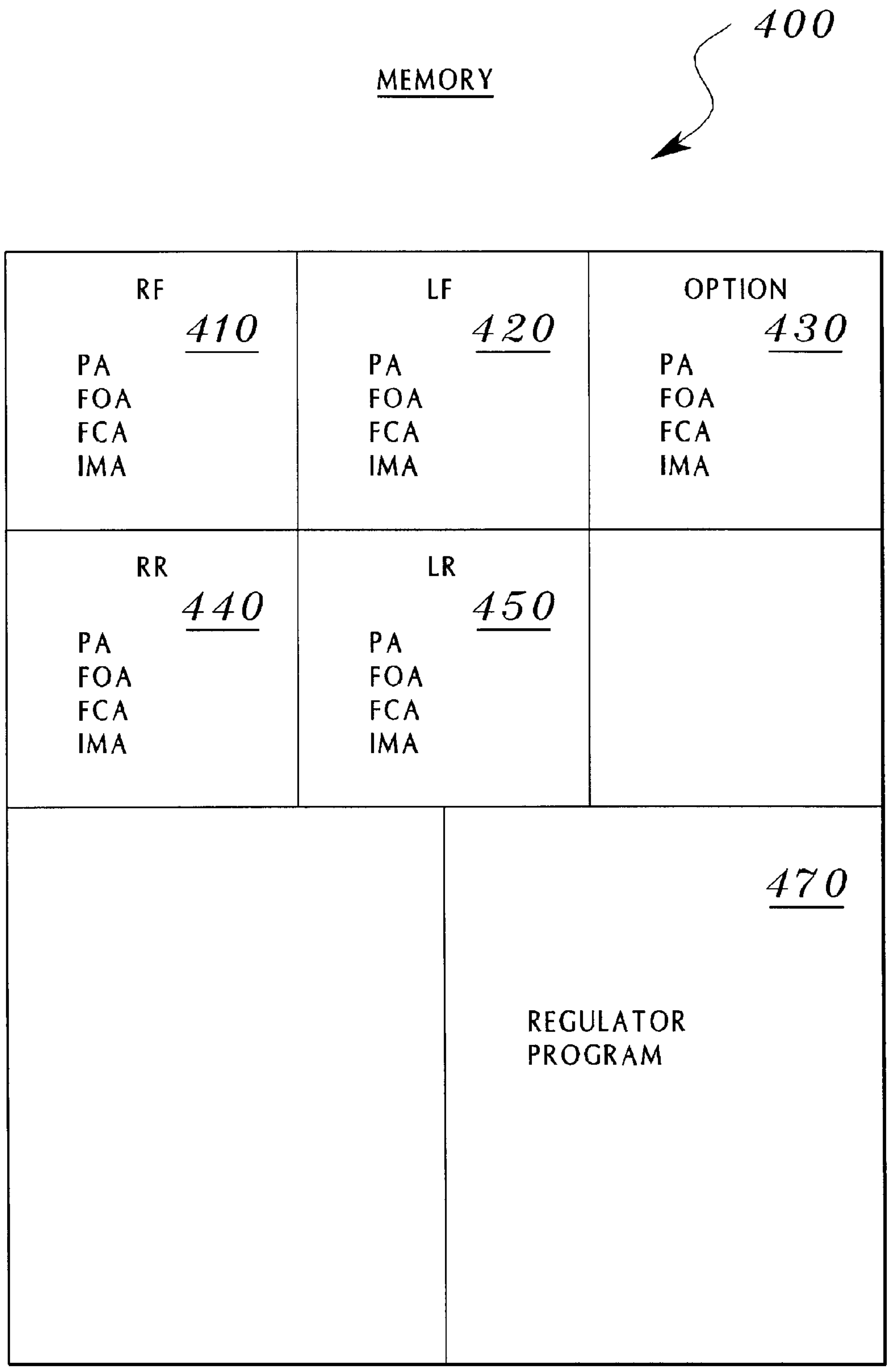
FIG. 5 depicts a diagram of the regulator memory.

FIG. 5 shows data 400 stored in memory 124 (FIG. 1). Right front window data 410 includes the position address for the operator preference which is the window location selected by the operator, the full open address, the full closed address and the intermediate address. Likewise for left front 420, right rear 440 and left rear 450 the position address (operator preference), the full open address, the full closed address and the intermediate address are recorded. Only the position address field is writable. Option addresses (430) may be included. Regulator program 470 is stored in memory 124.

If the automotive vehicle contains sensors for detecting rain, internal temperature sensors, theft detection sensors and occupancy sensors such as seat belt engagement or seat load detection, then regulator 100 can be connected by an optional main computer interface. Based on signals from the main computer the windows can be sent to the full closed, full open or intermediate positions by the main computer causing the regulator to send the corresponding position address to the client processors.

For example, if the driver has left the windows open and rain begins to fall, a rain sensor would cause the main computer to signal the regulator to send the position address for full closed. For this embodiment, the automotive vehicle would be equipped with an external enviromental sensor which would be linked to regulator 100 through main computer interface 110. Likewise, if the car alarm activated, the main computer would send a signal to the regulator causing the regulator to send the full closed position address to the windows. For this embodiment, the car alarm would be linked to regulator 100 through main computer interface 110. Additionally, if children or pets were left unattended in the automotive vehicle a seat load detector or a seat belt engagement detector and temperature sensor would cause the main computer to send a signal to the regulator to send the position address for full open or intermediate positions. For this embodiment, the seat belt engagement detector and internal temperature sensor would be linked to regulator 100 through main computer interface 110.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the are The embodiment was chosen and described in order to best explain the principles of the invention the practical application and to enable others of ordinary skill in the art to understand the invention for various embodiments with various modifications as are suited to the particular use contemplated.

What is claimed:

1. A method for moving power windows of an automotive vehicle to pre-selected positions comprising the steps of:

determining a position address for each of said power windows by receiving, in a window processor memory, a sensor address from a sensor connected to a window processor and to the window processor memory, assigning a position address to the sensor address by the window processor, and sending the position address to a regulator memory;

responsive to movement of a switch from a first position to a second position, determining whether the switch was held for less than time "t" or greater than or equal to time "t"; and responsive to a determination that the switch was held for less than time "t", sending position addresses to window processors.

2. The method of claim 1 further comprising the step of:

responsive to a determination that the switch was held for greater than or equal to time "t", requesting position addresses from the window processors; and determining a position address for each of said power windows.

3. The method of claim 1 further comprising:

responsive to receiving the position addresses, moving a plurality of windows to a plurality of positions corresponding to the position addresses.

4. The method of claim 1 further comprising:

responsive to receiving a new position addresses, replacing the old position addresses in a regulator memory with the corresponding new position addresses.

5. A method for moving power windows of an automotive vehicle to pre-selected positions comprising the steps of:

responsive to movement of a switch from a first position to a second position, determining whether the switch was held for less than time "t" or greater than or equal to time "t";

responsive to a determination that the switch was held for less than time "t", sending position addresses to window processors; and responsive to an external environmental sensor, causing the windows to go to a full closed position.

6. A method for moving power windows of an automotive vehicle to pre-selected positions comprising the steps of:

responsive to movement of a switch from a first position to a second position, determining whether the switch was held for less than time "t" or greater than or equal to time "t"; and responsive to a determination that the switch was held for less than time "t", sending position addresses to window processors; and responsive to a seat belt engagement detector and internal temperature sensor, causing the windows to go to a full open position.

7. The method of claim 6 further comprising:

responsive to an seat belt engagement detector and internal temperature sensor, causing the windows to go to an intermediate position.

8. A programmable apparatus for controlling the movement of electrically operated windows in an automotive vehicle comprising:

a switch with a first position and a second position programable hardware comprising;

a first processor and a first memory;

a plurality of second processors and a plurality of second memories; and a first program installed on said first memory, wherein, responsive to said switch moving from said first position to said second position and according to instructions from said program, determining whether the switch was held for less than time "t" or greater than or equal to time "t", responsive to a determination that the switch was held for less than time "t", sending position addresses to a plurality of second processors; and a second program installed on said plurality of said second memories, wherein, responsive to receiving position addresses from said first processor, causing said windows to move to a position corresponding to said position addresses; and a plurality of sensors connected to said plurality of second processors and to said plurality of second memories.

9. The first program of claim 8 further wherein, responsive to a determination that the switch was held for greater than or equal to time "t", requesting position addresses from the plurality of second processors.

10. The second program of claim 8 further wherein, responsive to receiving a request for a plurality of position addresses, determining new position addresses for a plurality of windows and sending said new position addresses to said first processor.

11. The switch of claim 8 further comprising a third position for moving the windows to predetermined positions.

12. The apparatus of claim 8 further comprising an automotive computer interface.

13. The apparatus of claim 8 further comprising a cache.

14. A method for moving a plurality of windows in an automotive vehicle to predetermined positions, said automotive vehicle having a switch, a first processor, a first memory, a plurality of second processors, a plurality of second memories, a plurality of sensors connected to said plurality of second processors and said plurality of second memories and a plurality of drives, the method comprising the computer implemented steps of:

responsive to movement of the switch from a first position to a second position, executing instructions from a first memory by a first processor to determine whether the switch was held for less than time "t" or greater than or equal to time "t";

responsive to a determination that the switch was held for less than time "t", sending a plurality of position addresses to a plurality of second processors; and responsive to receiving the position addresses, executing instructions from a plurality of second memories to cause a plurality of window drives to move a plurality of windows to a plurality of positions corresponding to the position addresses.

15. The method of claim 14 further comprising:

responsive to a determination that the switch was held for greater than or equal to time "t", requesting position addresses from the window processors; and determining a position address for each of said windows.

16. The method of claim 14 further comprising:

responsive to receiving position addresses from the window processors, replacing the old position addresses in memory with the corresponding new position addresses.

17. The method of claim 14 further comprising:

responsive to movement of said switch to a third position sending a full open position address to said windows.

18. The method of claim 14 further comprising:

responsive to movement of said switch to a third position two times, sending a full closed position address to said windows.

19. The method of claim 15 further comprising:

responsive to movement of said switch to a third position three times, sending an intermediate position address to said windows.

* * * * *